United States Patent
Edelstein et al.

(10) Patent No.: US 9,710,502 B2
(45) Date of Patent: Jul. 18, 2017

(54) DOCUMENT MANAGEMENT

(71) Applicants: Roy D. Edelstein, Waban, MA (US); Palle M. Pedersen, Brookline, MA (US)

(72) Inventors: Roy D. Edelstein, Waban, MA (US); Palle M. Pedersen, Brookline, MA (US)

(73) Assignee: EXPEDOX LLC, Waban, MA (US)

(*) Notice: Subject to any disclaimer, the term of this patent is extended or adjusted under 35 U.S.C. 154(b) by 106 days.

(21) Appl. No.: 13/833,722

(22) Filed: Mar. 15, 2013

(65) Prior Publication Data
US 2013/0262420 A1  Oct. 3, 2013

Related U.S. Application Data

(60) Provisional application No. 61/619,740, filed on Apr. 3, 2012.

(51) Int. Cl.
| | | |
|---|---|---|
| *G06F 7/00* | (2006.01) | |
| *G06F 17/00* | (2006.01) | |
| *G06F 17/30* | (2006.01) | |
| *G06F 17/22* | (2006.01) | |

(52) U.S. Cl.
CPC .... *G06F 17/30309* (2013.01); *G06F 17/2288* (2013.01); *G06F 17/30286* (2013.01)

(58) Field of Classification Search
CPC ........... G06F 17/30286; G06F 17/2288; G06F 17/30309
USPC ....................................................... 707/695
See application file for complete search history.

(56) References Cited

U.S. PATENT DOCUMENTS

| | | | |
|---|---|---|---|
| 5,671,428 A * | 9/1997 | Muranaga | G06Q 10/10 715/201 |
| 5,787,175 A | 7/1998 | Carter | |
| 5,805,889 A | 9/1998 | Van De Vanter | |
| 6,067,531 A | 5/2000 | Hoyt et al. | |
| 6,182,080 B1 | 1/2001 | Clements | |
| 6,823,340 B1 | 11/2004 | Clark | |
| 7,171,618 B2 | 1/2007 | Harrington et al. | |
| 7,236,939 B2 | 6/2007 | Chen et al. | |
| 7,401,082 B2 * | 7/2008 | Keene et al. | 707/785 |
| 7,496,841 B2 | 2/2009 | Hadfield et al. | |
| 7,532,340 B2 | 5/2009 | Koppich et al. | |
| 7,533,136 B2 | 5/2009 | Idicula et al. | |
| 7,546,360 B2 | 6/2009 | Chiroglazov et al. | |
| 7,574,441 B2 | 8/2009 | Clark | |

(Continued)

FOREIGN PATENT DOCUMENTS

WO   03090096 A1   10/2003

OTHER PUBLICATIONS

Cederqvist et al., Version Management with CVS, CVS 1.11.23, 1993. (pp. 1-10, 17, 27, 33-35, 76, 87, 90, 91, 113, 153).*

*Primary Examiner* — Kris Mackes
*Assistant Examiner* — Lin Lin Htay
(74) *Attorney, Agent, or Firm* — Brown Rudnick LLP

(57) ABSTRACT

The invention generally relates to document management, including the management of documents and versions of documents within collaboration and document sharing systems. An access tracking version manager according to the invention allows document versions to be stored and managed in situations where various people have access to different document versions within a document chain.

7 Claims, 9 Drawing Sheets

(56) References Cited

U.S. PATENT DOCUMENTS

| | | |
|---|---|---|
| 7,702,618 B1 | 4/2010 | Patterson |
| 7,730,129 B2 | 6/2010 | Wang et al. |
| 7,865,815 B2 | 1/2011 | Albornoz et al. |
| 7,895,166 B2 | 2/2011 | Foygel et al. |
| 7,908,247 B2 | 3/2011 | Ngo et al. |
| 8,010,418 B1 | 8/2011 | Lee |
| 8,121,985 B2 | 2/2012 | Krebs |
| 8,121,989 B1 | 2/2012 | Gengelbach |
| 8,230,351 B2 | 7/2012 | Patton et al. |
| 8,572,035 B2 * | 10/2013 | Cosic ............... 707/625 |
| 8,819,072 B1 * | 8/2014 | Croicu ............ G06F 17/30011 707/796 |
| 2002/0147739 A1 | 10/2002 | Clements et al. |
| 2003/0093525 A1 * | 5/2003 | Yeung ............ H04L 29/06 709/225 |
| 2003/0197895 A1 | 10/2003 | Koppich et al. |
| 2003/0217034 A1 * | 11/2003 | Shutt ............... G06F 17/30011 |
| 2003/0233621 A1 | 12/2003 | Paolini et al. |
| 2004/0021686 A1 | 2/2004 | Barberis |
| 2004/0064733 A1 | 4/2004 | Gong |
| 2004/0093323 A1 * | 5/2004 | Bluhm et al. ............ 707/3 |
| 2004/0225884 A1 * | 11/2004 | Lorenzini et al. ........ 713/176 |
| 2005/0097441 A1 | 5/2005 | Herbach et al. |
| 2007/0011212 A1 | 1/2007 | Koppich et al. |
| 2007/0118877 A1 | 5/2007 | Karabulut |
| 2007/0143425 A1 | 6/2007 | Kieselbach et al. |
| 2007/0201086 A1 * | 8/2007 | Kim ............... H04L 12/58 358/1.15 |
| 2008/0098294 A1 | 4/2008 | Le |
| 2008/0155430 A1 | 6/2008 | Prager et al. |
| 2008/0183819 A1 | 7/2008 | Gould et al. |
| 2008/0222419 A1 | 9/2008 | Tewfik et al. |
| 2010/0169305 A1 | 7/2010 | Patterson |
| 2011/0252109 A1 | 10/2011 | Steele |
| 2013/0014266 A1 | 1/2013 | Yeung |
| 2013/0024418 A1 * | 1/2013 | Sitrick ............ G06F 17/241 707/608 |
| 2013/0138619 A1 * | 5/2013 | Krislov ............... 707/695 |
| 2013/0145478 A1 * | 6/2013 | O'Gorman, Jr. ...... G06F 21/10 726/27 |

* cited by examiner

FIG. 7

708 — A1 -- Private Deal Dashboard
▲ Party A  ▲ *Party B*  ▲ Project: 2012 License Deal — 714
       710 ⌐           712 ⌐

ACTIVE DOCUMENTS

[ Share ]  [ More Actions ]

— Document Chain: License Agreement

| | System Labels (Comments) — 706 | Individuals with Access — 704 [Add Version] |
|---|---|---|
| v. Jan 26-16:34 by Me | Internal only | A2, A3 |
| v. Jan 26-12:20 by Me | Private | |
| *v. Jan 25-20:38 by B1* | LAST RECEIVED FROM *Party B* | A2, A3   *B2* — 718 |
| v. Jan 15      by A2 | LAST SHARED TO *Party B* (per call) | A2, A3   *B1* |
| v. Jan 11      by Me | Internal only | A2, A3 |
| *v. Jan 10     by B1* | Received from *Party B* | A2, A3   *B1* |
| v. Jan 04      by Me | Shared to *Party B* | A2, A3   *B1* |
| v. Jan 03-16:10 by A2 | Internal only (comments from A2) | A2, A3 |
| v. Jan 03-09:15 by Me | Internal only | A2 |
| v. Jan 02      by Me | Private (based on 2011 A X License Agr) | |

716

+ (show more)       Show only versions also accessible to *Party B* and my current version       − (show less)

702

+ Document Chain: Exhibit A to License Agreement

DOCUMENT MANAGEMENT

CROSS-REFERENCE

This claims priority to and the benefit of Provisional U.S. Patent Application Ser. No. 61/619,740 filed on Apr. 3, 2012, the entirety of which is incorporated herein by reference.

TECHNICAL FIELD

The invention generally relates to document management, including the management of documents and versions of documents within collaboration and document sharing systems. In one embodiment according to the invention, an access tracking version manager allows document versions to be stored and managed in situations where various people have access to different document versions within a document chain.

BACKGROUND INFORMATION

Document version management involves tracking different instances or versions of a document. Version management also is referred to as version tracking, revision control, or versioning.

Document management systems often include functionality to track versions, such as an ability to associate a document with the predecessor document from which it was created, display a list of versions which are sequential modifications of an original document, track when and by whom each separately saved version was saved to the document management system, and "roll-back" to designate an earlier version as the preferred one.

Document editing systems also often include version tracking options. Some editing systems provide for automatic version designation as a document is modified, at set time intervals, upon saving, or upon specific request.

Many collaboration and file sharing solutions incorporate some version tracking.

One existing version tracking approach in collaboration or file sharing solutions enables a user to save a document to a shared storage folder or virtual space, and later they or other users can save additional versions of the same document to the same shared folder, such that the multiple versions are together and available to users with access to such shared folder or space. Some existing solutions also automatically update the shared folder when the document is saved or eventually closed.

In some existing collaboration or file sharing solutions that include an integrated editing system, the system can capture new versions of documents as a document is modified or saved, so that a user with access to that document can view a list of document versions, and thus track edits and know who made the edits and when the edits were made.

Some existing systems further use pre-defined roles or permissions to manage access by individuals to items on the system. In such systems, an administrator or owner assigns certain roles or permissions to users. Examples include permissions to edit, approve, comment, read, etc., and the system can automatically grant access to items based on the pre-defined role or permissions of a user. The administrator or owner could be someone tasked with managing access to items on the system, or could be the creator of the original file or such person's designee.

SUMMARY OF THE INVENTION

Existing systems are poorly suited for projects where individuals are working with multiple versions of a document but wish to keep some document versions private or semi-private to a subset of the participants in the project. For example, in an adversarial contract negotiation, an individual acting for one of the parties may keep some electronic versions of the written contract (and/or notes associated therewith) entirely private, while sharing other versions of the contract (and/or notes) with colleagues or advisers and while also sharing yet other contract versions (and/or notes) with another party to the negotiation.

Systems, solutions, and methods according to the invention provide the privacy functionality that is lacking in existing systems. The invention relates to enabling privacy within collaboration to allow a user or a party to work with others on a single collaboration platform while still keeping certain document versions, notes, and sharing activities invisible to other users or parties, and without leaving the collaboration platform. This enables efficiencies of using a shared collaboration system and a consolidated interface, without sacrificing privacy.

Systems, solutions, and methods according to the invention also enable a user, even when that user is working alone, to easily interact with all associated document versions—private, semi-private, and broadly shared—as part of a single consolidated document chain; and to use available information about who else has access to each document version. Using that information, the invention not only enables a user to see at-a-glance who else the user knows to have each document version, but can also enable automatic activities that are otherwise unavailable or cumbersome.

One example that illustrates the usefulness and uniqueness of the invention involves the automatic comparison of a newly received document version with a highly relevant earlier document version—such as the last version shared by a colleague to a negotiating counter-party, or a more recent document version that was shared internally even though it has not been shared with the other side, or a set of preferred contract clauses for a given type of transaction even though such clauses are kept entirely private to the user. The invention can then further offer other document versions for comparison and indicate who else is known to the user to have access to each.

Embodiments according to the invention can include an access tracking version manager to manage information about document versions in situations where different sets of individuals have access to different document versions within a document chain. This manager can track and manage information about document versions where certain document versions are kept private from a subset of individuals, although the same individuals have access to other document versions associated with the same document chain.

The access tracking version manger can be implemented to capture and store access information as to specific document versions based, at least in part, on affirmative sharing by individuals. That access information can be captured and stored by use of a built-in sharing subsystem or from analyzing communications with document attachments.

In addition, the access tracking version manager can be implemented to track and manage notes associated with items tracked by the system such as projects, document chains, document versions, or sections or locations within document versions, or other notes, where individual notes are selectively kept private to any subset of the individuals involved. There can be one or multiple versions of a note. An individual instance of a note is referred to herein as a "note version".

The access tracking version manager can be implemented in a multi-party deployment as a system for centralized selective version sharing such that system users associated with any of multiple parties working on a common document chain can (i) associate a document version with a document chain, without resulting in automatically granting access to the specific document version to other system users who have access to other document versions in that document chain, other than to the extent that automatic role-based access has expressly been implemented by a system user or party—for example so that document versions are automatically made available to certain other individuals associated with that party, (ii) grant access to a document version within a document chain, without automatically granting access to all document versions within the document chain even if document versions are centrally stored, and (iii) grant, to specific individuals or groups, access to a document version within a document chain, without automatically granting access to other system users who have access to other document versions associated with the document chain, other than to the extent that automatic role-based access has expressly been implemented by a system user or party.

The access tracking version manager can be implemented such that in a multi-party deployment each party to a project can independently manage, without oversight from any other party, access permissions to document versions it contributes to a common document chain.

The access tracking version manager can be implemented to identify from a collection of related document versions, which ones are most relevant to a system user or party based, at least in part, on which ones were received from, or shared to, whom, and when.

The access tracking version manager can be implemented to capture, organize and convey information about who has access to different document versions within a document chain, and how and when they obtained such access, by analyzing communications with attachments or collections of communications with attachments.

These are not the only functions, features, and advantages of the invention. In view of the drawings, specification, and claims that follow, additional functionality, features, and advantages will be apparent and are considered part of this disclosure of the invention.

BRIEF DESCRIPTION OF THE DRAWINGS

The following drawings are part of this disclosure and are referenced in the detailed description that follows this brief description of the drawings. The drawings are not necessarily to scale. The drawings are intended to aid the reader in understanding the invention and certain disclosed embodiments according to the invention.

FIG. 7 is a screenshot of an interface for an application displaying to a first system user who is associated with a party, information retrieved in response to a search.

DETAILED DESCRIPTION

Figure 1:
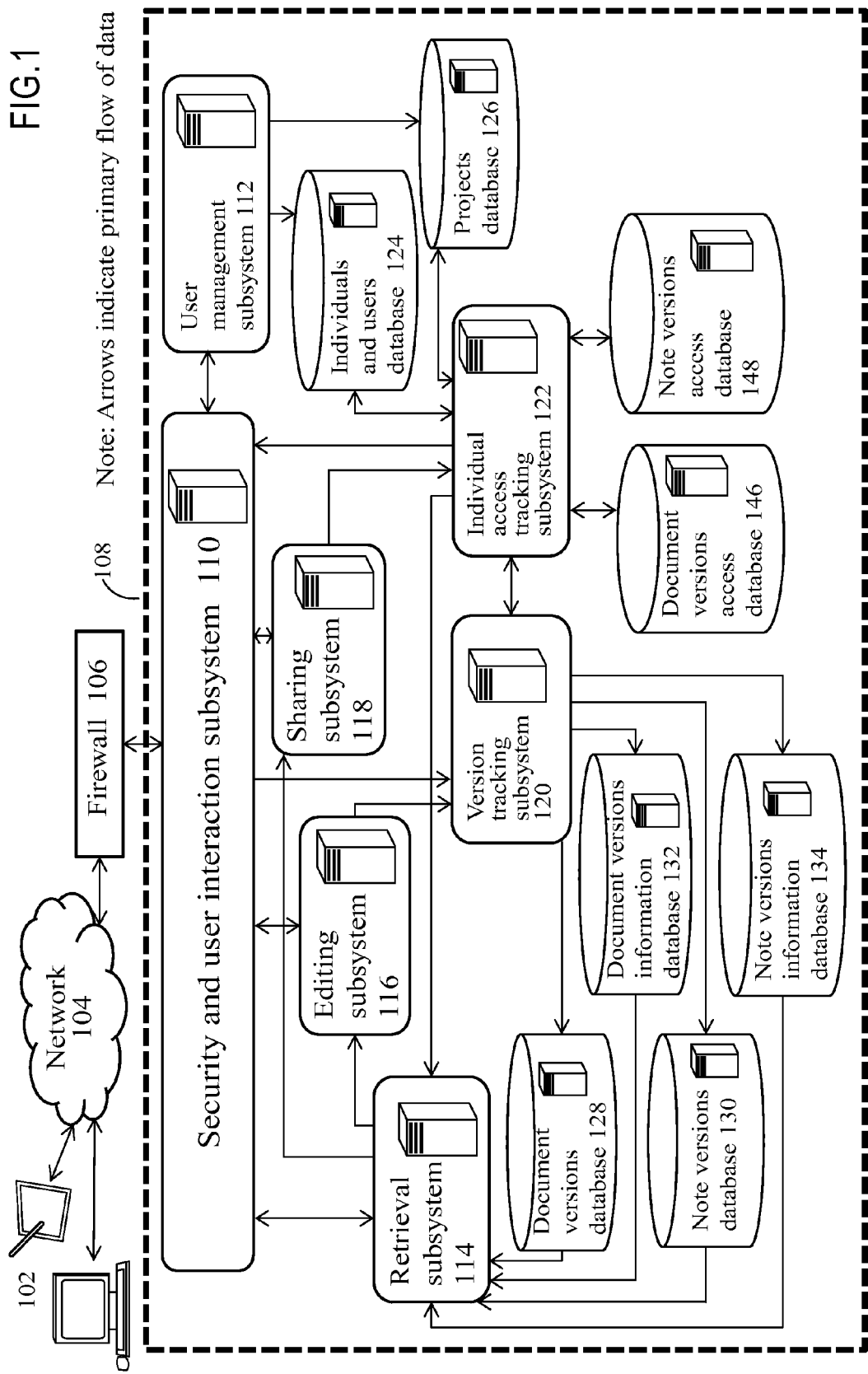
FIG. 1 is a system diagram for an example implementation in a multi-user deployment.

At its core, an access tracking version manager according to the invention is a computer-implemented system that handles information about various document versions and who has access to each of the document versions. A document version is an individual instance of a document, and it may be associated with a document chain which consists of a collection of document versions that are similar or related. An implementation of a document chain could be represented by a directed acyclic graph, wherein multiple document versions can come from a single document version, and multiple document versions can be merged into a single document version. A document chain can have one or multiple starting document versions and one or multiple ending document versions.

Document versions may initially be paper or electronic files, and could include, by way of example, text, word processing, spread sheets, images, or presentation materials such as Microsoft® PowerPoint®. They may be exchanged electronically and/or as paper copies. They could include document versions that are created by editing a prior document version with a word processor, created by an automated process based on another document version or other information, and generated by printing a prior document version and then writing comments on it and scanning the new document version. The contents of each document version could be, for example, the terms of a legal contract, computer software code, engineering designs or blueprints, or any other substantive alphanumeric and/or graphic content. In one particular embodiment, the document versions contain legal agreement terms such as the terms of a purchase agreement, a joint venture agreement, or a license agreement.

A document version may be a section of another document version, such as an individually numbered clause, or group of clauses, a paragraph, a portion of the document delineated by document structure or grammar, a portion of text identified by a system user to be treated as a section, or a portion of text identified by analyzing a document for text that is highly similar to other known sections. A document version that is a section of a larger document version could be associated with that larger document version, but also with any number of other document versions, within the project document chain, or outside of that project document chain. For example, a section that is labeled "indemnification" in a document version, could be associated with (a) other sections of the same document version, (b) indemnification sections from the other document versions associated with that project, or (c) indemnification sections from document versions outside of that project, including document versions from other projects, document versions tagged by a system user as "favorites", or document versions from libraries of document versions accessible to a system user (such as a library of clauses approved by a company for use by certain individuals, or a library of clauses offered by a third party to subscribers, or a library of clauses shared by a group/community of system users).

Note versions can also be handled by an access tracking version manager, as well as information about such note versions, who has access to each note version, and who has access to each item with which a note version is associated. A note version is an individual instance of a note, and can be associated, for example, with one or more other items such as projects, document chains, document versions, sections or locations within document versions, or other note versions. Examples of note versions include cover notes in communication systems such as email messages, comments within a document version (such as through a commenting feature, within special formatting such as brackets, or otherwise), comments noted as part of file properties or metadata, messages in project message boards, project to-do lists, and notes captured directly in the access tracking version manager. A note version may be associated with multiple other note versions that are highly similar, are part of a single conversation, are associated with a common topic, are associated with the same projects, document chains, document versions, sections or locations within document versions, or other note versions, or are associated with the same individuals or groups.

An access tracking version manager can capture and store information about document versions and possibly note versions, and about associations between and among them.

For each document version and note version, the access tracking version manager captures and stores information about which individuals have access to the version and how those individuals obtained such access. The access tracking version manager can determine which individuals have access to each of the versions and how those individuals obtained such access by, at least in part, analyzing affirmative sharing by individuals, and optionally also based on information about role-based access granted by an administrator or owner or their designees.

Affirmative sharing of document versions can include, for example, (a) sending of a document version as an attachment to a communication such as email, (b) uploading a document version to a shared space or file sharing system, (c) sending an invitation or link to a shared space or file sharing system, (d) sharing access information such as a token or certificate, (d) sending a document version by fax, (e) sharing through an integrated sharing subsystem, (f) inviting an individual to access a document version through another collaboration system, etc. Similar approaches can be used for affirmative sharing of note versions.

The access tracking version manager can also use information from role-based access management where an administrator or owner, or its designee, assigns to system users certain pre-defined roles or permissions, for example by categorizing them as an "editor", "approver", or "reader", and such roles or permissions are then used by the system to implicitly determine access to new document versions or note versions.

As a result, access to a document version, or a note version, may be permanent as a result of past events, for example, where an individual received an email with the document version attached, or an individual was granted permission to download the document version and did so. Other access might be temporary, for example where access is through a token which permits a system user only to view a document version and only for a limited time, or through a system where an administrator can grant access and then later revoke it. Access may be granted within or outside of an access tracking version manager, as long such access information can be captured by it.

The system can then selectively retrieve and use document versions, note versions, and associated information, to perform actions that are possible because the system has access information for each item. Such actions can be performed on behalf of individuals who are system users, or for other systems acting on behalf of such individuals.

The result is that the access tracking version manger can be implemented to capture and store access information as to specific document versions based, at least in part, on affirmative sharing by individuals, and can track and manage document versions where certain document versions are kept private from a subset of individuals, although the same individuals have access to other document version associated within the same document chain.

Further the access tracking version manger can be implemented to track and manage note versions associated with items tracked by the system such as projects, document chains, document versions, or sections or locations within document versions, or other notes, where individual notes are selectively kept private to any subset of the individuals involved.

When deployed for multiple parties, the system can be implemented such that system users associated with any of multiple parties working on a common document chain can (i) associate a document version with a document chain, without automatically granting access to the specific document version to other users who have access to other document versions in that document chain, other than to the extent that automatic role-based access has expressly been implemented by a system user or party—for example so that document versions are automatically made available to certain other individuals associated with that party, (ii) grant access to a document version within a document chain, without automatically granting access to all document versions within the document chain, even if document versions are centrally stored, and (iii) grant, to specific individuals or groups, access to a document version within a document chain, without automatically granting access to other system users who have access to other document versions associated with the document chain, other than to the extent that automatic role-based access has expressly been implemented by a system user or party.

Further, an access tracking version manager can be implemented such that each system user can independently manage, without oversight from any other system user, access permissions to document versions it contributes to a common document chain. Similarly, it can be implemented such that in a multi-party deployment each party to a project can independently manage, without oversight from any other party, access permissions to document versions it contributes to a common document chain.

Such a system can also be implemented to perform sharing and permissions management on behalf of a system user, or handle editing of document versions and note versions.

An example of where an access tracking version manager would be relevant is in a project such as a contract negotiation between two or more parties that are counter-parties in the negotiation. In such a project, individuals often work on document versions that are not intended for sharing, or for only limited sharing, while the goal of the process is to reach a final document version that is agreeable to all parties. In such a project, an access tracking version manager according to the invention can track and manage on behalf of a system user, all within a single system, information about: (a) document versions kept private and not accessible to any other individual, (b) other document versions accessible to colleagues associated with the system user's own party but yet kept private from any other individuals, and (c) yet other document versions shared with or received from individuals associated with the counter-party in the negotiation. Information tracked and stored by the access tracking version manager can include access information about who has access to each document version, and how they obtained such access. An access tracking version manager could also be used to store, track, manage, draft, edit, receive and selectively share document versions.

Furthermore, in such a contract negotiation project, a single access tracking version manager could be used by different system users, associated with different counter-parties, whereby the access tracking version manager could, for each system user, privately track and manage multiple document versions, where some may be kept private and others shared with all or only selected other individuals.

Similarly, in such a contract negotiation project, each individual may write note versions associated, for example, with the project, a document version, or sections or locations within a document version. Using an access tracking version manager, each system user can store, track, manage, draft, edit, receive and selectively share such note versions and related information, based on who has access to the note version and who has access to the associated projects, document chains, document versions, sections, or other notes, as applicable.

Example Implementation

Figure 9:
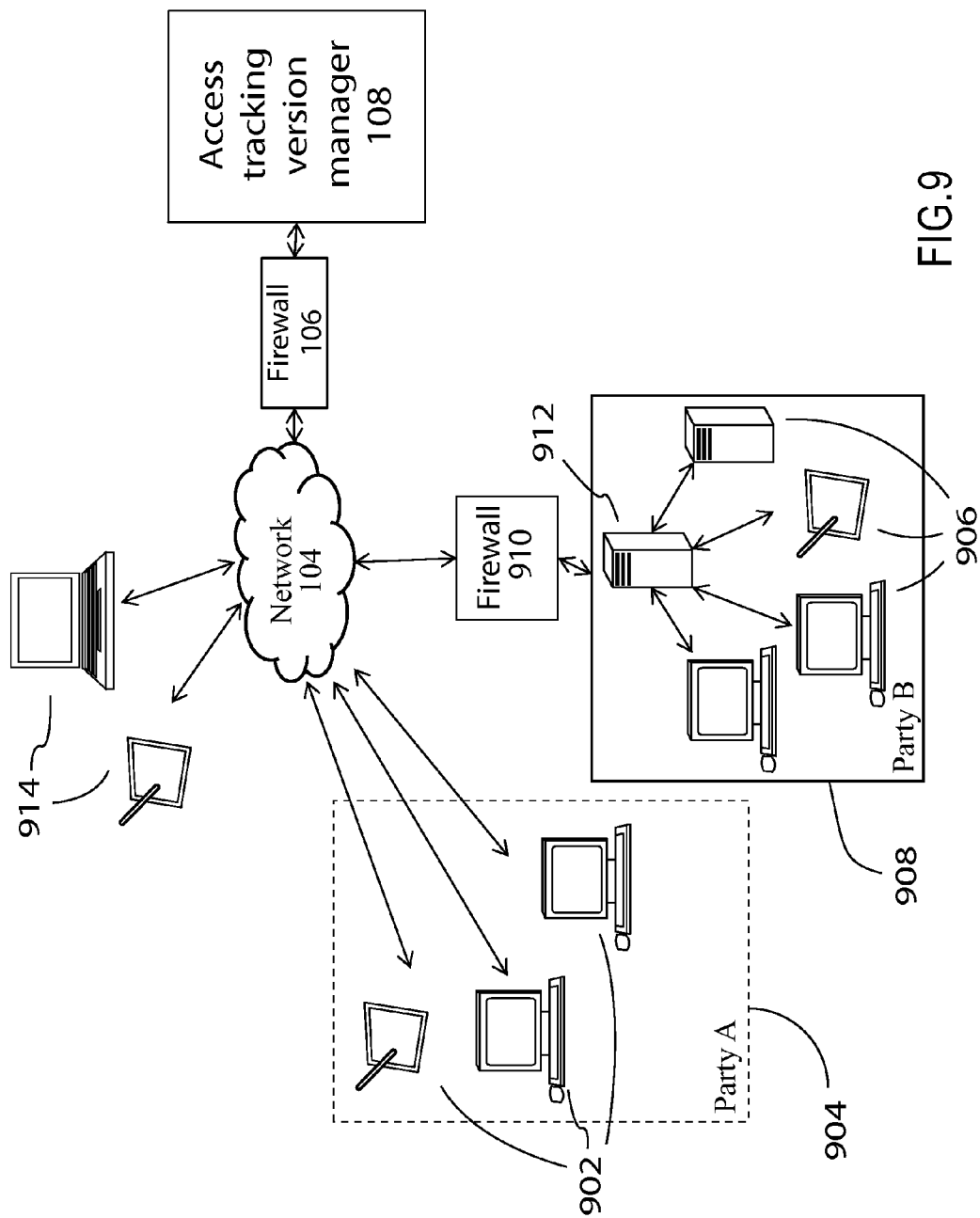
FIG. 9 is a diagram showing an example context in which an access tracking version manger could be implemented.

FIG. 9 shows an exemplary context in which an access tracking version manager according to the invention could be implemented. This figure shows the access tracking version manager 108 connected through a firewall 106 and a network 104 to system users 902 at party A 904; to system users 906 at party B 908 through a firewall 910 and a party B server 912; and to system users not associated with a specific party 914.

FIG. 1 shows an exemplary implementation which could be deployed for use by multiple system users associated with multiple parties, and which could be operated by a party that is independent of the parties participating in particular projects. This figure shows the access tracking version manager 108 connected through a firewall 106 and a network 104 to system users 102 who may be associated with the same or different parties.

This exemplary implementation is made up of (a) computers configured to perform subsystem and database activities described herein, (b) conduits for transmitting information internally between such subsystems and databases, and (c) an input/output mechanism for interacting with system users. The computers can be located in a single location or in multiple locations connected by communication conduits which may include a network such as the internet.

The exemplary implementation has seven subsystems—a version tracking subsystem 120, an individual access tracking subsystem 122, a retrieval subsystem 114, a user management subsystem 112, an editing subsystem 116, a sharing subsystem 118, and a security and user interaction subsystem 110.

The disclosed system further includes data storage, which in the exemplary implementation is divided into eight databases—the document versions information database 132, the document versions database 128, the note versions information database 134, the note versions database 130, the document versions access database 146, the note versions access database 148, the individuals and users database 124, and the projects database 126.

In the exemplary implementation, each subsystem and each database resides on a separate computer configured to execute the activities of such subsystem or database. Each computer includes one or more processors or central processing units (CPUs), and each computer is configured to execute instructions residing in computer-readable storage to perform the functions of the applicable subsystem or database. The database computers further include non-volatile storage, wherein the information associated with such database is stored and accessed according to the database parameters. Instructions can be computer software code, firmware, and/or any other such processor-executable instructions. The instructions may be in any language such as a high-level procedural language, an object-oriented programming language, and/or an assembly or machine language. The programming language may be compiled or interpreted, i.e., configurable or configured to be executed by the one or more processors. The computer-readable storage may be one or more volatile and/or non-volatile computer storage devices such as ROM, RAM, EPROM, EEPROM, Flash, one or more smart cards, one or more magnetic disc storage devices, and/or one or more optical storage devices.

Internal interactions within the disclosed system between the subsystems and databases occur primarily along the communication conduits denoted in FIG. 1 running between them.

External interactions between the disclosed system and a system user occur in the exemplary implementation through the security and user interaction subsystem 110. Such subsystem is connected to system users through communication conduits or a network such as the internet, by which the system receives inputs from, and provides outputs to system users, or systems acting on behalf of system users. In the exemplary implementation such communications can be conveyed to a system user through a software client on any number of devices, including a desktop computer, laptop, mobile device, or other network enabled devices. A software client could be a web browser, an application, a mobile application, a plug-in to standard software such as email and word-processing software, etc. Communications could also be conveyed through external communications methods, such as email, fax, sms, voice-mail, or even paper mail, and could extend to communications to individuals who are not system users. Such subsystem could include suitable hardware to interface with the respective communication conduits, including wired connections, optical communication channels, radio channels, microwave channels and the like. Conduits can be part of a dedicated network or a shared network.

Alternatively, the access tracking version manager could be deployed with fewer or more computers configured for such purpose, or even with a single computer properly configured for such purpose. For example, an implementation could be designed wherein the subsystems are implemented as modules or components of one or more software applications to be stored in memory and executed by one or more processors, with access through communication conduits to storage as described above, and with communications conduits and input/output mechanisms for receiving and sending information to system users or other individuals, or to systems acting on their behalf, also as described above.

Versions Tracking Subsystem

The version tracking subsystem 120 captures and manages document versions and associated information, as well as note versions and associated information. It captures document versions, note versions, and associated information from system users 102 through the security and user interaction subsystem 110, and from the editing subsystem 116. It determines associations between and among document versions, note versions, and associated information. It stores document versions in the document versions database 128, note versions in the note versions database 130, information about document versions and their associations in the document versions information database 132, and information about note versions and their associations in the note versions information database 134. It also uses the individual access tracking subsystem 122 for handling and storing information about individuals and projects as well as information about which individuals have access to specific document versions and note versions.

Document version information can include when the document version was created and by whom, file metadata such as file name, metadata embedded within the file, associations with any projects, document chains, or other document versions including document versions that are sections of other document versions. Such information is stored in the document versions information database 132.

Points at which the version tracking subsystem 120 could capture document versions and related information include: (a) a document version is received as an attachment to a communication such as an email sent or forwarded to the system or otherwise accessible to the system, (b) a document version is uploaded by a system user, (c) a document version is created using the editing subsystem 116 or another editing system that communicates with the version tracking subsystem 120, (d) document versions are captured by analyzing a system user's email or other communications archive, document storage locations, zip and other archive files, file servers, cloud storage, or existing document management systems, (e) a document version is faxed to the system, (f) information is provided by a system user, (g) information is included as meta information with the file, (h) a document version is captured by the word processor, (i) a document version and related communication is captured by the email client, (j) a document version and related communication is captured on email or other communication server, (k) a document version and related information received from an automated process based on another document version or other information, (l) a document version and related communication is captured by mobile communication device such as phone or mobile device, (m) a document version and related information is captured from an image file, (n) a document version is captured from an audio file, (o) document versions are captured from a shared library of document versions, etc. The system can also be implemented with an individual email address for a system user or for a system user's specific project, so that communications can be sent directly, copied, or forwarded to the system user's address within the system.

Places from which the note versions can be captured include: (a) the text of a communication's cover note such as email body, (b) Microsoft® Word® document comments, (c) Microsoft Word document meta information, (d) other document versions which refer to a document version by name or reference, (e) data entered by a system user, (f) data from internal or external systems based on document version or other note version information, (g) similarly dated information from the individuals involved with the document version, (h) bracketed or otherwise marked content within the content of a document version, etc. The related note versions information can include when the note version was created and by whom, any identifying information such as a name, associations with any projects, document chains, document versions, and/or sections or locations within document versions, and associations with any other note versions. Points at which the version tracking subsystem 120 could capture note versions and related information include the points listed above for capturing document versions and related information. Note versions are stored in the note versions database 130, and note version information is stored in the note versions information database 134.

Examples of associations that can be captured, generated or otherwise determined by the version tracking subsystem include associations between (a) document versions and other document versions (including other document versions that are sections of a larger document version), (b) note versions and document versions, or (c) note versions and other note versions (including note versions that are sections of other note versions). These associations are stored in the document version information database and the note versions information database 134.

Examples of methods for fully or partially determining associations between document versions include: (a) text comparisons with other document versions, including to determine whether two document versions contain identical or nearly identical content, (b) text comparison with internal or external document databases, (c) finding document versions with similar names, (d) finding sections with similar header(s) (e) analysis of tags or content, (f) capturing use within the same project, (g) analysis of access information or communications history for access by the same individuals or similar groups, (h) analysis of communications subject line or text, (i) input from a system user, (j) using information from a parent document version, (k) using information generated by the sharing subsystem 118 or editing subsystem 116, (l) using translation technologies to associate document versions in different languages, etc.

By way of example of the version tracking subsystem's 120 activities, upon receiving an email with a document version attached, it could: store the document version in the document versions database 128; store information such as the file name, date of receipt, and other meta-data in the document versions information database 132; store the email text in the note versions database 130; store information about the note in the note versions information database 134; store an association between the document version and the note version in the note version information database 134; extract sender and recipient information from the email and convey this information to the individual access tracking subsystem 122.

Individual Access Tracking Subsystem 122

The individual access tracking subsystem 122 captures and conveys information about who has access to each document version and stores this information in the document versions access database 146. Similarly, the individual access tracking subsystem 122 captures and conveys information about who has access to each note version and stores this information in the note versions access database 148.

Access information can be captured from any of the points described above for the capture of document versions or note versions. Access information can be captured from affirmative sharing, including, for example, by analyzing communications such as email to extract information about the sender, or past senders, and recipients. Access information can optionally also be captured from role-based access control rules established by an administrator or owner or its designees, and from input from system users.

The individual access tracking subsystem 122 also manages information about individuals who are known to have access to document versions or note versions, and stores information about such individuals in the individuals and users database 124. The individual access tracking subsystem 122 also interacts with the version tracking subsystem 120, the sharing subsystem 118 and the retrieval subsystem 114, as described above and further below, to capture information made available by such other subsystems, or convey information needed by such other subsystems, relating to which individuals have access to each document version or note version.

Information captured by the individual access tracking subsystem 122 includes information about how each individual obtained access to each document version or note version, who originally granted access, and who subsequently granted access—to the extent that such information is made available by the parties granting access. Based on this information, the system can also determine, in whole or in part, which party to a project was the original source of each document version, and the system can flag such determination for review or confirmation by the system user.

For example, consider a scenario where individual A1 associated with party A sends a document version as an email attachment with a cover note to individual B1 associated with party B, and then individual B1 privately forwards the document version through the system's sharing subsystem 118 or through another communication method whereby the original attachment is forwarded along with both the original cover note and an additional cover note to individuals B2, B3, B4, and B5 associated with party B.

In this scenario, the document version and the original cover note were affirmatively shared by individual A1 to individual B1, and then both such items as well as the additional cover note were affirmatively shared by individual B1 to individuals B2, B3, B4 and B5.

The individual access tracking subsystem 122 captures the information about access to the document version by A1, B1, B2, B3, B4 and B5 and records such information in the document versions access database 146. The individual access tracking subsystem 122 further records that individuals B1, B2, B3, B4, and B5 all know that each has access to this document, however it does not record that individual A1 knows of access by any other individuals other than individual B1.

Similarly in this scenario, access to the original cover note is recorded by the individual access tracking subsystem 122 in the note versions access database 148, along with information about who knows of such access. As with the document version, there is no record that individual A1 knows of access by any other individuals other than individual B 1.

Finally in this scenario, access to the additional cover note sent by individual B1 to individuals B2, B3, B4 and B5 is also recorded by the individual access tracking subsystem 122 in the note versions access database 148, along with information about who knows of such access. Individual A1 does not have access to this note version, and so even though the note version is associated with the original document version shared by individual A1, the existence of this note version is not visible to individual A1.

Examples of information that the individual access tracking subsystem 122 can capture and store about individuals known to have access to document versions or note versions, include an email address, phone number, fax number, network identifier, or any other communications address, and such information is stored in the individuals and users database 124.

It can also store in the projects database 126 information about an individual's associations (a) to other individuals—which can include associations to groups, or to other individuals who were senders or recipients of a communication with the individual sent or received, (b) to parties—which may consist of one or multiple individuals, and (c) to projects—which can be within a single party or can involve multiple parties.

It also stores in the projects database 126 other information about projects. Examples of project related information include project name, initial creator of the project, start date of the project, status of the project, and associations with document versions, individuals, system users, groups (including parties to a project such as a negotiation).

Based on the list of recipients of a document version or note version, the individual access tracking subsystem 122 associates a document version or note version with a specific project, or identifies multiple possible projects which can then be presented to a system user to select. The project association is then communicated to the version tracking subsystem 120 which stores the association in the document version information database or note version information database.

The individuals and users database 124 and projects database 126 can also be updated by the user management subsystem 112 based on input from system users.

User Management Subsystem 112.

Information about individuals and system users is stored in the individuals and users database 124. Individuals include anyone who is known to have access to a document version or note version, whether or not they use the access tracking version manager. System users are the subset of individuals who are using the access tracking version manager.

The user management subsystem 112 captures and manages information about system users, and associations between users, individuals, groups and projects. It stores such information in the individuals and users database 124 and in the projects database 126. Such information can also be partially or fully captured and managed by the individual access tracking subsystem 122 as described above.

Individuals and system users can have associations with multiple communications identities, multiple projects, multiple groups, and multiple parties. For example, a single attorney may have an association with (a) multiple email addresses and fax numbers, (b) multiple different clients, each of which is a party to multiple projects, (c) multiple overlapping or non-overlapping groups of individuals associated with individual projects and individual document versions, (d) other overlapping groups of individuals who are colleagues within the same law practice or who are external colleagues with whom the attorney collaborates on continuing education materials or model documents, and (e) a party to a lease negotiation project for his own apartment where one party consists of just the single attorney and no other individuals.

In another example, a sales representative may be associated with both (a) a group that is limited to individuals associated with his negotiation party and (b) with another group that includes individuals from multiple parties who are tasked with a particular aspect of a project.

The user management subsystem 112 authenticates a system user and the system user's association to particular individual identifiers, which could include email addresses, phone numbers, fax numbers, certificates, biometric identifiers, network identifiers, or other means of communication or identifying information.

This subsystem provides access for system users to manage group associations, which can include a distributed responsibility among system users associated with a group, to identify who belongs within or outside of a group, and can also include administration by designated group administrators. Management of associations between individuals and groups, including parties, can also be performed automatically and without express management by system users, for example: (a) the system generates associations between individuals who send or receive the same communications, (b) based on similarities in communications addresses, or (c) based on information provided by system users in the past about what individuals are associated with a given party.

The user management subsystem 112 also enables a system user to grant management rights to other system users to act as administrators, and provides the interface for such administrator to perform such management.

Security and User Interaction Subsystem 110.

The security and user interaction subsystem 110 provides a user interface for interacting with system users 102 or other systems operating on behalf of system users 102. It interacts with the version tracking subsystem 120, the individual access tracking subsystem 122, the retrieval subsystem 114, the user management subsystem 112, the editing subsystem 116 and the sharing subsystem 118.

Retrieval Subsystem 114.

The retrieval subsystem 114 retrieves and conveys document versions and note versions from the document versions database 128 and note versions database 130, based on search criteria. It interfaces with the individual access tracking subsystem 122 to limit search results based on who has access to specific items. It also interfaces with the security and user interaction subsystem 110 to convey document versions, document version information, note versions, or note version information, to or on behalf of system users, and with the editing subsystem 116 and the sharing subsystem 118 when such subsystems need to use a document version or note version.

The search criteria include information about the system user for whom the retrieval subsystem 114 is acting.

Other search criteria can include (a) project identifiers, (b) party identifiers, (c) document chain identifier or key words, (d) document version identifier(s), (e) note version identifier(s), (f) individual identifier(s), (g) subject matter, (h) words or phrases, (i) rules about what information to return, (j) rules about prioritizing results, (k) a request to find similarities or differences compared to other document versions, (l) a request to find other document versions with related origin, (m) date and time ranges, (n) a request to find document versions with same or similar sections, (o) a request to find other document versions that would be highly relevant (as described further below), etc.

Search criteria can be captured by the retrieval subsystem 114 in a number of ways, including (a) input by system user, (b) system user's current and recent actions, (c) information based on where the system user was coming from, (d) historical preferences, (e) project settings, (f) other information related to the system user, etc.

The retrieval subsystem 114 communicates with the individual access tracking subsystem 122, which checks the individuals and users database 124 and projects database 126 for any applicable permissions, and queries the document versions access database 146, and the note versions access database 148 to identify which document versions or note versions the system user has access to, and conveys that information back to the retrieval subsystem 114.

The retrieval subsystem 114 can then limit the information that it conveys based on the information about which items the system user has access to. For example, when conveying information in response to search criteria for a document chain, the retrieval subsystem 114 could keep invisible to a system user all information about the existence of document versions or note versions to which that system user does not have access. Similarly, when conveying information about a document version, the retrieval subsystem 114 could further convey note versions, or portions of note versions, for note versions that (a) are associated with that document version, and (b) have been made accessible to the individual receiving the information. Similarly, when retrieving and conveying a note version, the retrieval subsystem 114, or sharing subsystem 118 described below, could convey information, items, or links to document versions or sections of document versions referenced in the note version, but limit such information based on whether the system user or individual recipient has access to both (a) the note version, and (b) the item which it references or to which it is otherwise associated.

Search criteria could include a choice to return highly relevant document versions based on chronology information and access information or other information available about the system user. For example, the criteria for highly relevant document versions could be document versions most recently received from and most recently shared to another party, and any subsequent document versions created by a system user's party but that have not yet been shared with the other party. Or highly relevant document versions criteria could be the most recent document versions to which certain individuals or groups have been granted access by a specified individual or group. The specific criteria used to retrieve highly relevant document versions could change based on information about the specific system user or about access information for a particular project or document chain.

Information conveyed by the retrieval subsystem 114 can include, for example, information about document version date, creator, source of access, file name or other original designation, access information, associations to other items, etc. The information can be presented or used so that multiple individuals can confirm that they are viewing the same document version, even while other information about their individual views may differ (as described below).

The retrieval subsystem 114 can also generate and convey comparisons between two or more document versions using an internal or external version comparison solution for determining differences between document versions.

The retrieval subsystem 114 can select for initial comparison the versions that are likely to be useful to an individual based on the captured access information for document versions in the document chain. For example, the retrieval subsystem 114 could initially convey a comparison of the differences between the document version most recently received from an individual associated with a counter-party in a negotiation project, compared against the last document version shared to that counter-party by an individual associated with the system user's party. Examples of alternate comparisons that a system user could switch to or set as a default, include a comparison view of the latest document version compared against (a) the last document version received from an individual associated with a specific party, (b) the last document version shared by an individual associated with the system user's own party, (c)

the last document version that is known by the system user to have been accessible to the counter-party, (d) the last document version that is known to have been accessible to a specific individual, (e) the system user's favorite document version template for this type of project, even if that document version may not be accessible to any other individuals, (f) a standard document version template approved by system user's party for this type of transaction, (g) a set of document versions that are sections the system user has identified as favorites, (h) document versions that are sections that the system has identified as favorites, for example from a system user's past activities, the activities of multiple system users, or other means, (i) multiple prior document versions such as the last document version received from the counter-party and all subsequent internal versions, or (j) any other document versions, including document versions that are not otherwise identified by the system as related.

Further, the retrieval subsystem 114 could select a different default comparison for different situations, based on the captured access information. For example, in an example where a document version is the current document version and was received from an individual associated with a different party, the system could default to compare against the last document version sent out by the system user's party to that counter-party. But in a different example where there have been several private or internal document versions since the last document version received from the counter-party, the default comparison could convey changes by multiple internal editors since the last document version received from the counter-party, with options to switch to a comparison against the last document version shared internally by the system user, or another option to switch to a comparison against the last document version shared by the system user's party. Where multiple document versions are compared, information can be conveyed to indicate which document version included which changes, or when each change was made and by which individual or party.

Further, when conveying the comparison information, the retrieval subsystem 114 can further convey summary information about the extent of differences. For example, a display of a list of document versions within a document chain could also include for some or all listed document versions a percent of the document that is different when compared to a selected document version, such as the current document version. Such a summary could display any number of different metrics, such as the number of words that are different, the number of sections that are different, or graphs of differences over time. Each such metric could be displayed for each document version in the document chain, or for selected document versions where such information would be of greater interest based on who has access to the document version.

Similarly, the retrieval subsystem 114 can generate and convey comparisons between two or more document versions that may be sections of larger document versions. These could be from a single document chain, or from different document chains, or from document versions that are not otherwise identified as related, and one or more of these document versions could be from a library of document versions to which the system user has access.

The retrieval subsystem 114 can convey information regarding a document chain or collection of otherwise related document versions for presentation through the security and user interaction subsystem 110 in an organized manner, or through the sharing subsystem 118, or can convey such information through the security and user interaction subsystem 110 to an external system that provides the user interface for such presentation. For example, based on the access information previously captured, the retrieval subsystem 114 can convey to each system user a unique list of document versions within each document chain based on which document versions and note versions the system user is known to have access to, or such system user's party is known to have access to. Document versions can be presented chronologically, and can be labeled by the system based on which were most recently received or shared by the system user or the system user's party. Each document version can be identified with a system generated name or other identifier to facilitate quick confirmation that individuals are viewing the same document version, and the name can be color coded based on information such as the origin of the specific document version. The system can also convey or make easily accessible information about the original file name for the document version, or the subject line associated with a note version, that was associated with such item when it was captured by the system. Similarly it can identify to a system user or other recipient that document versions with different names have identical or nearly identical content, or it can consolidate the presentation of such document versions while maintaining separate information about when each document was received, from whom, with what file name, etc. Each document version can include a list of individuals known to the system user to have access to that document version. The system can also convey with each document version some indication that note versions are associated with the document version, or convey all or a portion of such note versions, or links to such note versions.

The retrieval subsystem 114 also interacts with the editing subsystem 116 and the sharing subsystem 118.

Editing Subsystem 116

The editing subsystem 116 provides editing functionality for drafting or modifying document versions or note versions.

The editing subsystem 116 can retrieve existing document versions or note versions using the retrieval subsystem 114 and allow editing of such document versions or note versions based on the permissions conveyed by the retrieval subsystem 114 and managed by the individual access tracking subsystem 122.

The editing subsystem 116 conveys document versions, note versions and any related information (e.g. who created it) to the versions tracking subsystem 120 as new document versions or note versions are created so that the document versions database 128, document versions information database 132, note versions database 130 and note versions information database 134 are updated. The version tracking subsystem 120 then communicates any new version to the individual access tracking subsystem 122, which can by default record such new document version or note version as accessible only to the system user performing the editing, unless other rules have been implemented.

Sharing Subsystem 118.

The sharing subsystem 118 provides a communication interface whereby the system can receive instructions from system users through the security and user interaction subsystem 110 about who should be granted access to particular document versions or note versions, and how such access should be granted. The sharing subsystem 118 then grants such access and conveys to the individual access tracking subsystem 122 new access information so that the document versions access database 146, the note versions access database 148, the individuals and users database 124, and the projects database 126 can be updated.

The sharing subsystem 118 could notify an individual that they have been granted access in a variety of ways, including: (a) sending an email or other external communication with the document version or note version attached as an included or a downloadable file, (b) sending an email or other external communication with a link for access through the system, (c) sending an email or other external communication with a note version in the text of the communication, (d) sending an email, sms, voice-mail, or other communication that the system has new information available for the individual, (e) providing a notice the next time a system user activates or logs into the system, (f) sending a fax of the document version or note version, etc. In several of the above methods for granting access, the recipient need not become a system user.

The sharing subsystem 118 can also manage the sharing of note versions, and provide a system user with controls for reviewing and managing which note versions are to be shared with whom.

Multiple note versions can be compiled into a document version, or into a compilation of note versions that could be delivered through the sharing subsystem 118 or an external communication like email, and can include links within each note version to access specific items referenced in the note version, or to which it is otherwise associated, such as specific document versions, sections or locations within document versions, and a link from such other items back to the note version. Access to the note version, and to any associated item, could be managed based on what items the recipient already has access to or will have access to as a result of the sharing subsystem 118 activity that is being requested.

The sharing subsystem 118 can also capture input from a system user through the security and user interaction subsystem 110, and inform the individual access tracking subsystem 122 about specific permissions granted to a recipient regarding actions that may be performed with a given document version or note version.

For example, the default permissions could be limited to only viewing and commenting through the system (and disallowing sharing, downloading, or editing). Or permissions could be set to include activities such as:
  (a) editing through the system only,
  (b) sharing, but only through the system,
  (c) printing,
  (d) downloading, but only as locked document format such as a pdf,
  (e) downloading in an editable format.

The sharing subsystem 118 communicates the applicable permissions to the individual access tracking subsystem 122, which then updates the document versions access database 146 or note versions access database 148. Later, when the retrieval subsystem 114 retrieves the applicable document version or note version, the applicable action permissions are communicated to the retrieval subsystem 114 to govern how the results are conveyed and how they are used within the sharing subsystem 118 and the editing subsystem 116.

Using the sharing subsystem 118, each system user, or any administrator authorized by the system user to perform sharing and access management activities, can have independent administrative authority for sharing and managing permissions for particular document versions within a document chain, to the extent that the document version was contributed by such system user or party. The system can be implemented so that each system user has such management authority, or a party can limit such management authority to certain administrators associated with the party. However, in the exemplary implementation, management authority is independent of oversight from the other party or parties associated with the project. For example, a single document chain that includes document versions accessible to system users from party A only, document versions accessible to system users from Party B only, and document versions accessible to system users from both parties, can include some document versions for which party A has independent management of access permissions, and other document versions for which party B has independent management of access permissions. The system can be implemented so that document versions for which access has been granted with full permissions to edit, share and download, can be further shared by a system user or party using the sharing subsystem 118 without oversight from, or notice to, the other party or parties.

Example of Document Version Capture from an External Communication

Figure 2:
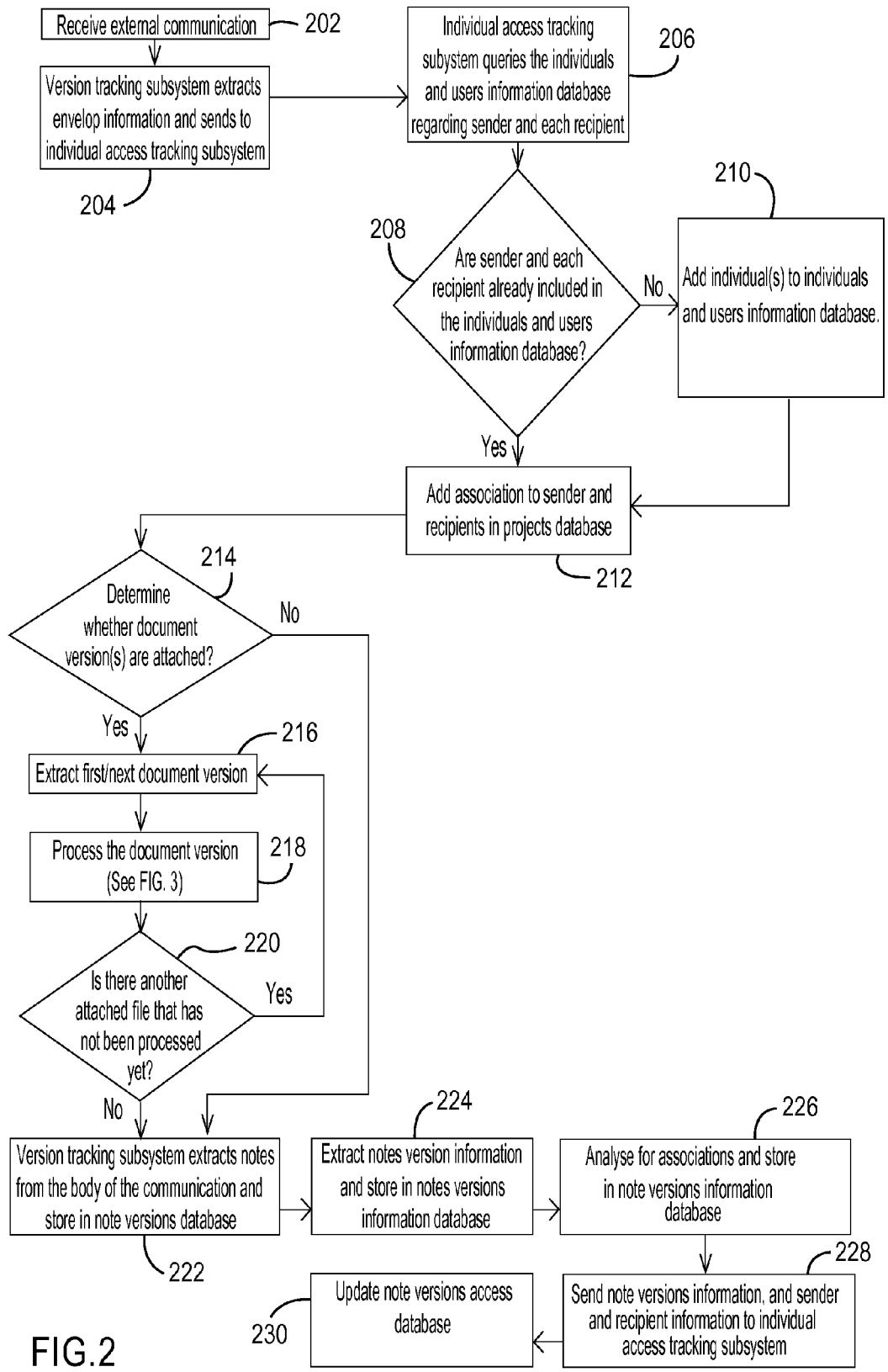
FIG. 2 is a flowchart illustrating an example of capturing document versions, note versions, and access information, from an email or other external communication system.

FIG. 2 illustrates an example of capturing document versions, note versions and associated information from affirmative sharing by an individual to designated recipients, where such affirmative sharing is through an external communication method such as email. In this example, the version tracking subsystem 120 receives the external communication 202, extracts the envelop information 204, and sends 204 such information to the individual access tracking subsystem 122. If the communication was forwarded by a system user, the version tracking subsystem 120 may further need to analyze the forwarded text to extract the list of recipients from the forwarded email body, and can flag the extracted information for confirmation by the system user.

The individual access tracking subsystem 122 then queries the individuals and users database 124 regarding the sender and each recipient 206 to check whether such individuals are already included in such database 208. If any individual is not already included in that database, then each such individual is added to that database 210.

When the sender and all recipients are in the individuals and users database 124, the individual access tracking subsystem 122 adds an association for each such individual to each such other individual and stores such association in the projects database 126, 212.

Next the version tracking subsystem 120 determines whether any document versions are attached to the received communication 214. If a document version is attached, the version tracking subsystem 120 extracts the document version 216, processes it 218 as illustrated in more detail in FIG. 3, and checks whether there are any additional document versions attached that have not already been extracted and processed 220. If there are additional document versions to be processed, the system repeats the extraction 216 and processing 218 steps until all document versions have been processed.

When there are no additional document versions to be processed, the version tracking subsystem 120 extracts the note from the body of the communication (in this case the email text) 222 and stores it 222 in the note versions database 130, and extracts note version information and stores it 224 in the note versions information database 134.

The version tracking subsystem 120 then determines associations between the note version and the project, each document version that was attached to the email, any sections that are referenced in the note version, and any other note versions that are referenced in the note version 226. It then stores 226 all such associations in the note versions information database 134.

Finally, the version tracking subsystem 120 sends 228 note version information and the sender and recipients information to the individual access tracking subsystem 122 so that it can update 230 the note versions access database 148.

Example of Document Version Processing

Figure 3:
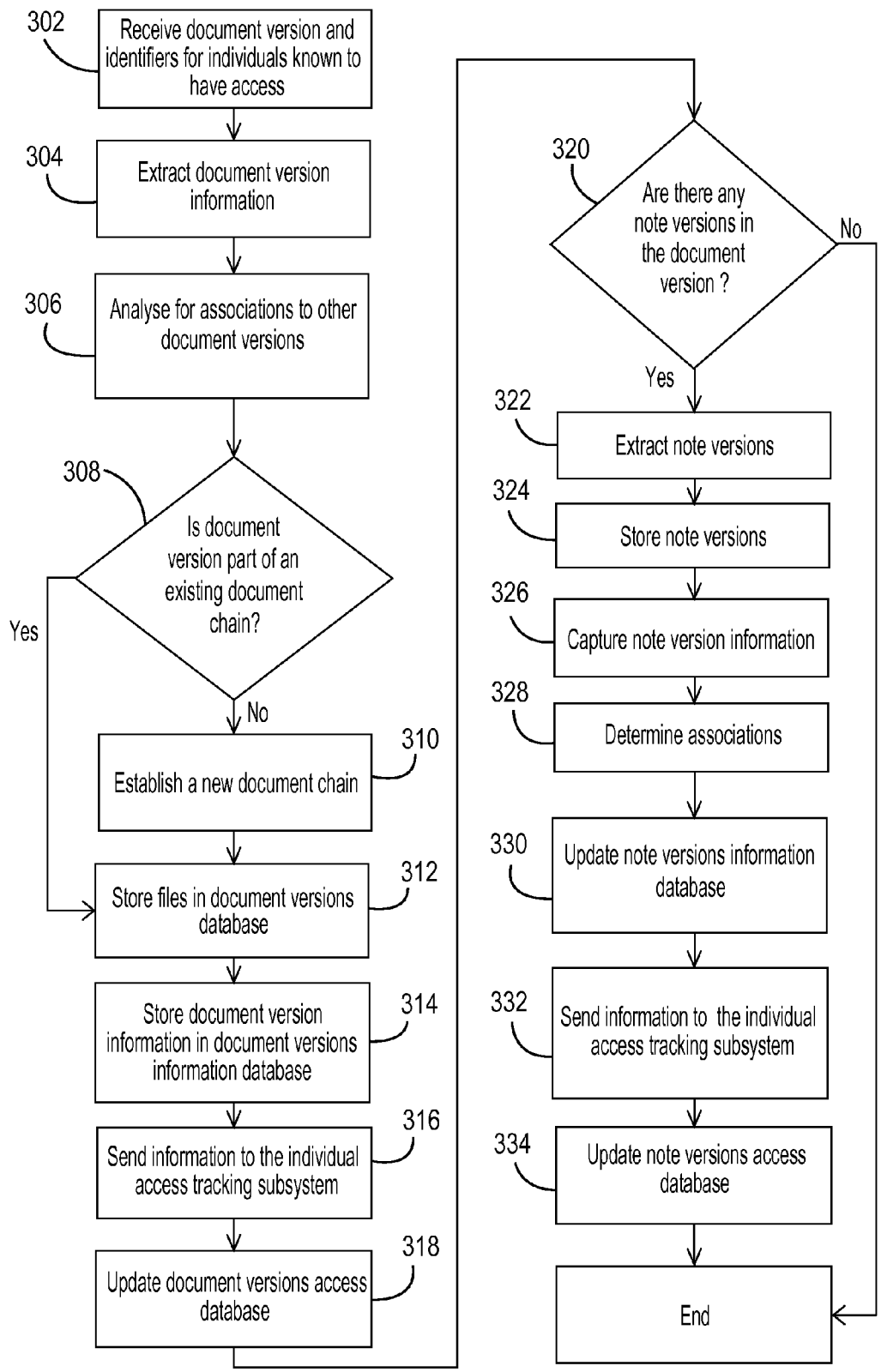
FIG. 3 is a flowchart illustrating an example of processing document versions and note versions.

FIG. 3 illustrates an example of processing document versions and note versions, starting from receipt by the version tracking subsystem 120 of a document version and identifiers for the individuals known to have access (such as the individual who shared the document version and each individual with whom it was shared), and ending with the document version database, document version information database, note version database, note versions information database 134, document version access database and note versions access database 148 all fully updated. The document version could be received by capturing it from an external communication (as described above), or from another process, such as receipt from a system user by uploading a file, or activities of the editing subsystem 116 or sharing subsystem 118.

Upon receiving 302 the document version and identifiers for each individual known to have access to such document version, such as the individual sharing the document version and each individual to whom it was shared, if any, 302, the version tracking subsystem 120 captures any other information available about the document version, such as the file name, identifiable project association, and other available information 304.

Next it analyses the document version, and associated information, to determine associations with other document versions 306.

If the document version is not associated with an existing document chain 308, the version tracking subsystem 120 starts a new document chain 310. When at least one document chain association has been established, the version tracking subsystem 120 stores 312 the document version file in the document versions database 128 312 and stores the document version information including any associations with other items in the document version information database 314.

The version tracking subsystem 120 then sends to the individual access tracking subsystem 122 certain document version information and the list of individuals known to have access to the document version 316, so that the document versions access database 146 can be updated 318.

The version tracking subsystem 120 then evaluates whether there are note versions embedded in the document version 320, such as in word processing comment features, or bracketed content within the document version. If not then the document processing is complete. If yes, then the version tracking subsystem 120 extracts the note versions 322 and stores them 324 in the note versions database 130.

Next it captures note version information 326 and determines any associations, including to the document version, the applicable document chain, any relevant sections or locations of the document version specifically associated with the note version, and to other note versions, 328. It then updates the note versions information database 134 with all captured note version information, including all such associations 330.

The version tracking subsystem 120 then sends to the individual access tracking subsystem 122 certain note version information and the list of individuals known to have access to the note version 332, so that the note versions access database 148 can be updated 334.

Further, where an access tracking version manager is implemented with access to all or a part of a system user's or party's archive of communications with attachments, the system can repeatedly execute the steps illustrated in FIG. 2 and FIG. 3 described above to capture document versions, document version information, note versions, note version information, associations between such items, and information about what individuals have had access to each of these items, when and from whom. The system can then retrieve individual items or organized collections of items based search criteria.

Example of Retrieval of Document Versions on Behalf of a System User

Figure 4:
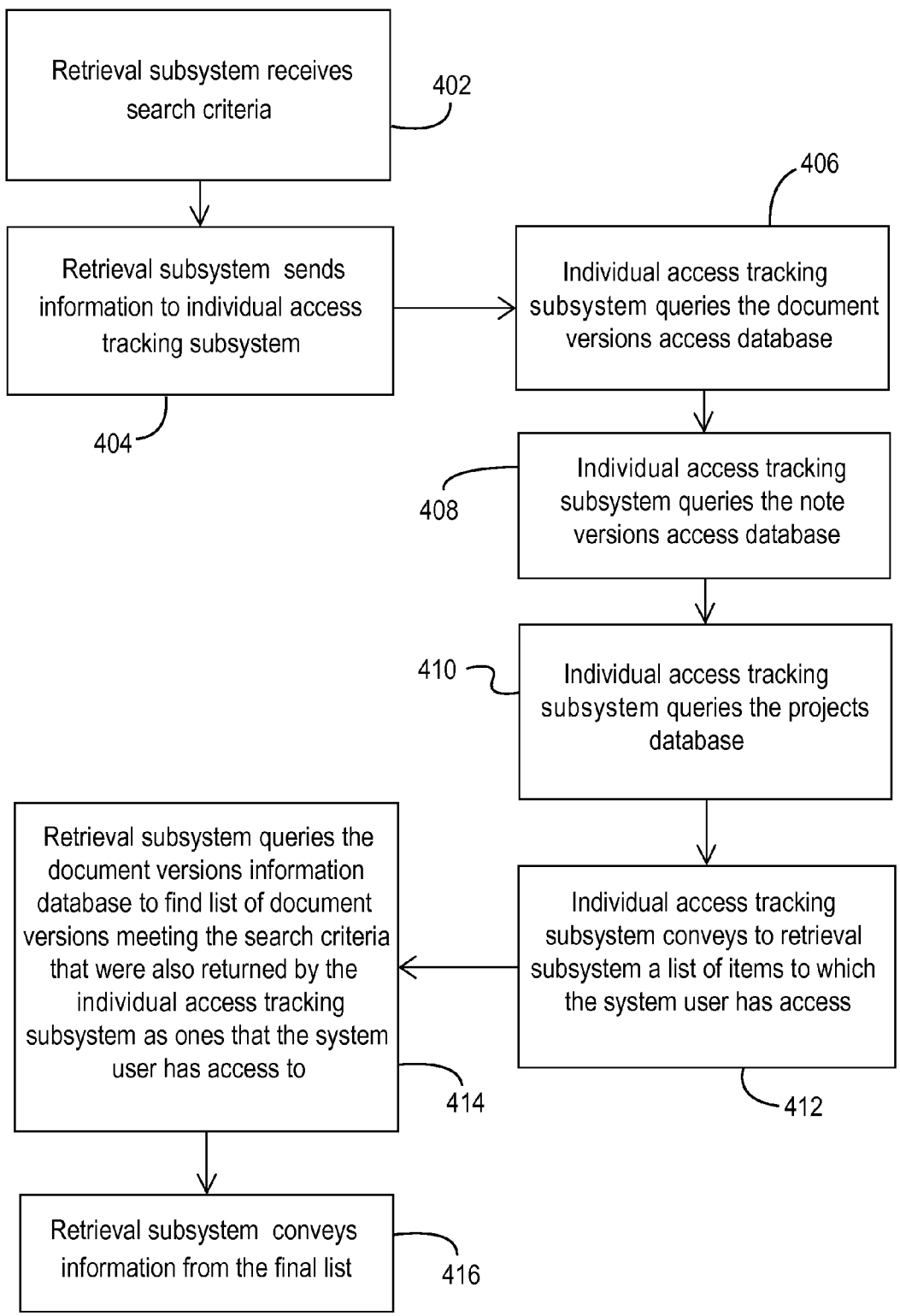
FIG. 4 is a flowchart illustrating an example of retrieving a list of document versions on behalf of a system user.

FIG. 4 illustrates an example of retrieving a list of document versions on behalf of a system user based on search criteria. Specifically this example illustrates how the list of document versions presented in the left hand column of FIG. 7 702 was generated, starting from the receipt by the retrieval subsystem 114 of search criteria on behalf of system user A1 requesting document versions associated with a particular document chain and project. Similarly, the same process applies to how the left hand column in FIG. 8 802 was generated on behalf of system user B1. A similar process could be used to retrieve note versions.

Upon receipt of search criteria from system user A1, such as information about the system user, project and document chain 402, the retrieval subsystem 114 queries the individual access tracking subsystem 122 with the search criteria 404, which in turn queries 408, 410 the document version access database 406, the note versions access database 148, and the projects database 126, 410.

The individual access tracking subsystem 122 conveys to the retrieval subsystem 114 a list of document versions and note versions to which system user A1 has access 412.

The retrieval subsystem 114 then queries the document versions information database 132 to find a list of document versions meeting the search criteria that were also returned by the individual access tracking subsystem 122 as ones that system user A1 has access to 414.

The retrieval subsystem 114 can then convey information from such list 416 for presentation to system user A1. The left hand column 702 in FIG. 7 includes an example of how such information could be presented to system user A1.

Example of Retrieval of Access Information on Behalf of a System User

Figure 5:
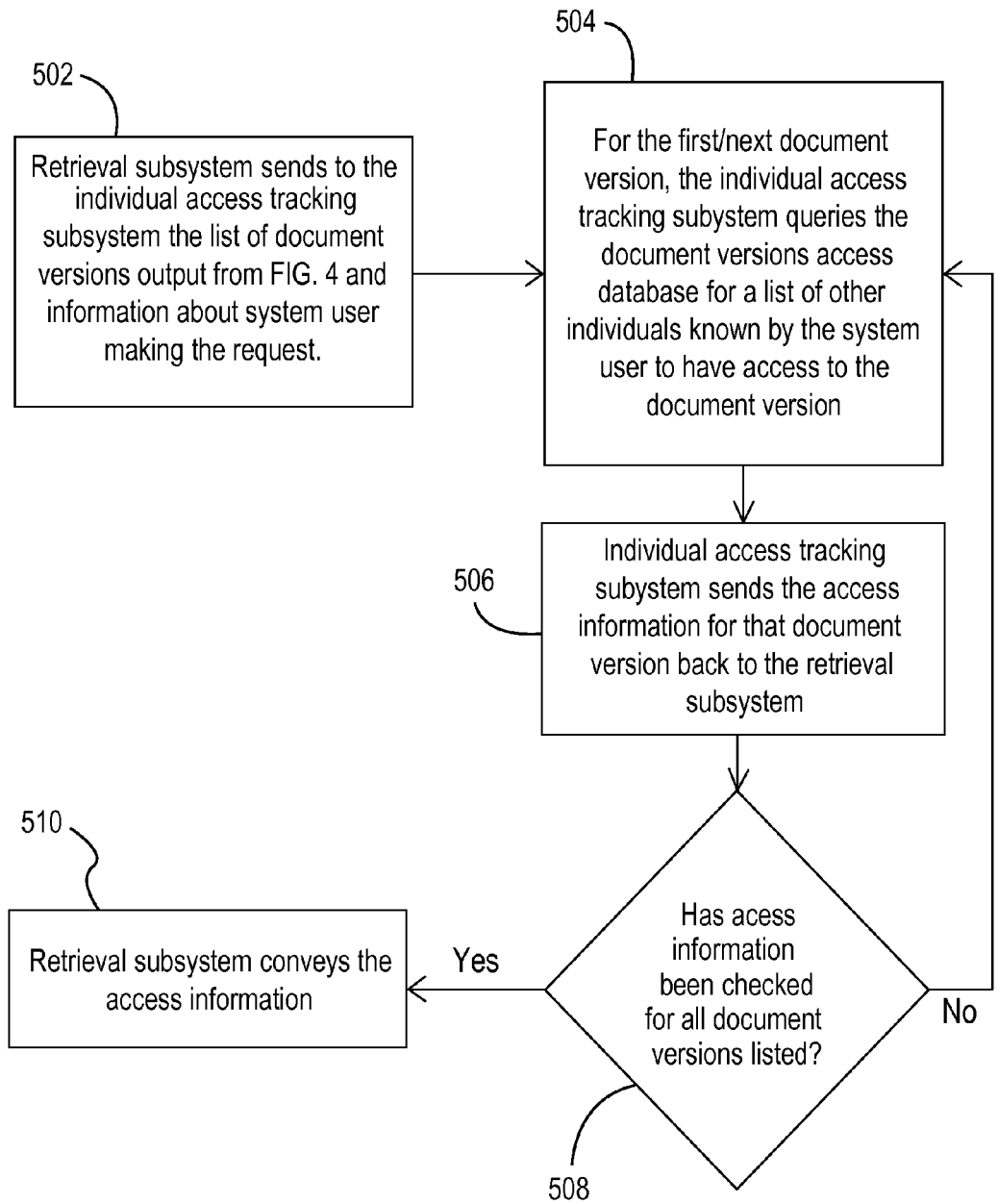
FIG. 5 is a flowchart illustrating an example of retrieving document version access information on behalf of a system user.

FIG. 5 illustrates an example of retrieving on behalf of a system user certain access information relating to individual document versions. A similar process could be used to retrieve access information regarding note versions.

Specifically, this example illustrates how the information presented in FIG. 7 in the column titled "Individuals with Access" is generated. This column is a listing of who has access to each document version, can be generated. The same process would apply to how the comparable portion of FIG. 8 can be generated on behalf of system user B1.

Such example starts with the list of document versions generated in the example in FIG. 4 on behalf of system user A1, and an additional search request to retrieve access information for each such document version, and ends with the delivery of access information for each such document version.

In this example, the retrieval subsystem 114 starts by sending to the individual access tracking subsystem 122 the list of document versions generated from FIG. 4 as well as the information about the system user making the request 502.

The individual access tracking subsystem 122 performs the following steps for each document version in the list.

First it queries the document versions access database 146 for a list of individuals known to the system user to have access to the document version 504 and conveys 506 that list of individuals back to the retrieval subsystem 114.

The subsystem then evaluates if access information has been checked for all document versions listed 508. If "no" then it returns to check the next document 504. If "yes" then the retrieval subsystem 114 conveys the access information 510 for presentation to system user A1. The column titled "Individuals with Access" 704 in FIG. 7 includes an example of how such information could be presented to system user A1.

Example of Labeling Document Versions Based on Access Information

Figure 6:
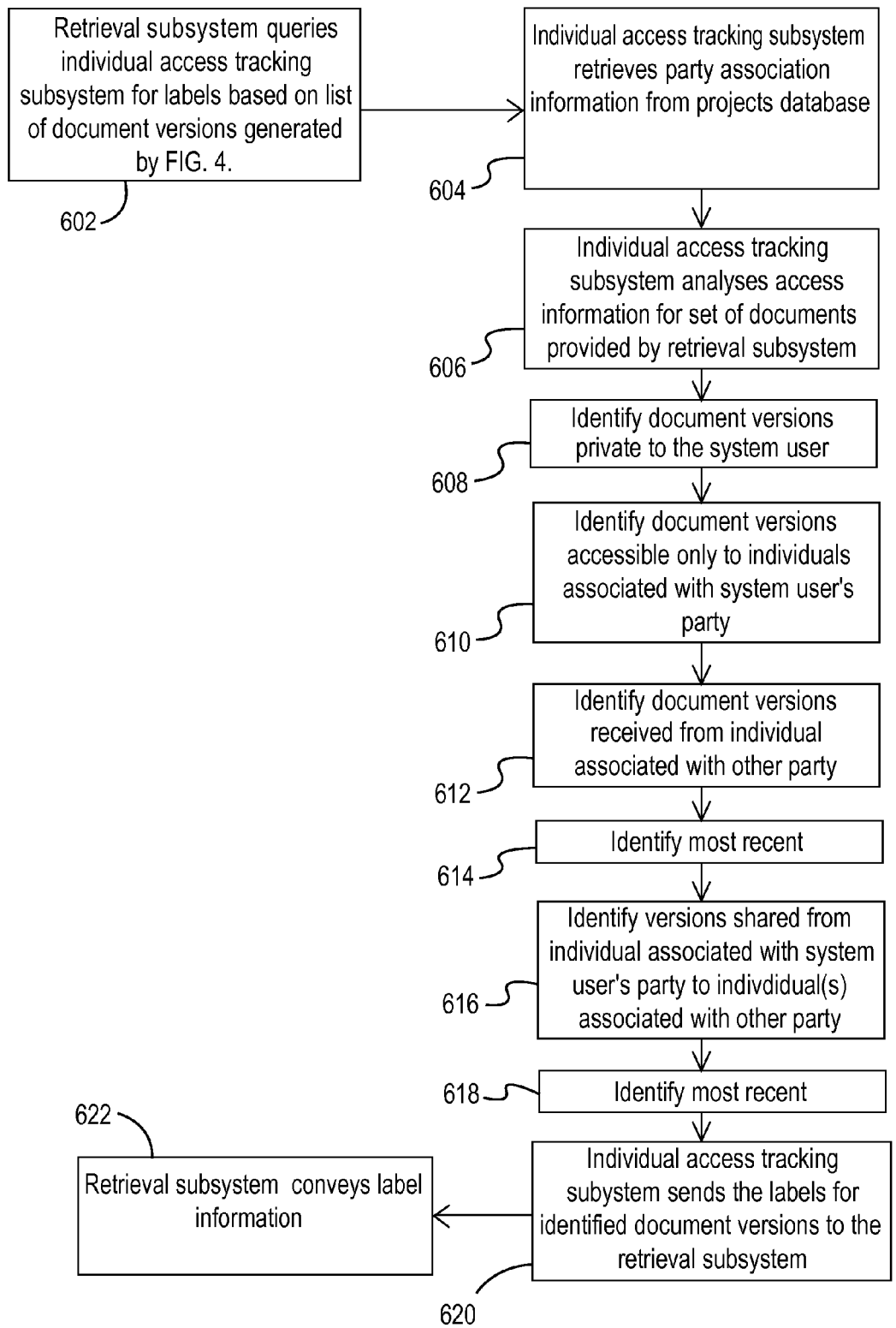
FIG. 6 is a flowchart illustrating an example of labeling document versions based on access information.

FIG. 6 illustrates an example of labeling document versions based on an individual's access information, party associations, and chronology.

Specifically, this example illustrates how certain information presented in the column titled "System Labels" 706 in FIG. 7 can be generated on behalf of system user A1. The same process would apply to how the comparable area of FIG. 8 806 can be generated on behalf of system user B1. A similar process could be used to generate labels for a project involving more than two parties.

Such example starts from the information generated in the examples in FIG. 4 and FIG. 5, and an additional search request to label document versions based on access information, party associations, and chronology, and ends with delivery of such labels for display to the system user.

The retrieval subsystem 114 queries the individual access tracking subsystem 122 for labels based on the list of for document versions available to system user A1 within a document chain as generate in FIG. 4 602.

The individual access tracking subsystem 122 retrieves from the projects database 126 information about which individuals are associated with which parties 604.

It then analyses the access information for the document versions listed by the retrieval subsystem 114 within the document chain 606.

The individual access tracking subsystem 122 identifies document versions which are not accessible to any other individual, and labels them as "Private" 608.

Next it identifies document versions which are accessible only to individuals who are associated with the same party as the system user, and labels them as "Internal only" 610.

Next it identifies document versions which were received from any individual not associated with the system user's party, and labels them "Received from" and inserts the party affiliation of the individual who granted access to such document version 612. It then further identifies the most recent of such document versions and labels it "LAST RECEIVED FROM" and inserts the party affiliation of the individual who granted such access 614.

Next it identifies document versions which were shared by any individual associated with the system user's party, and labels them "Shared to" and inserts the party or parties affiliated with the individuals who received access to such document versions 616. It then further labels the most recent such document version as "LAST SHARED TO" and inserts the party affiliation of the recipient 618.

It then sends 620 the label information to the retrieval subsystem 114, and the retrieval subsystem 114 conveys the access information 622 for presentation to system user A1.

The column of FIG. 7 entitled "System Labels" 706 includes an example of how such information could be presented to system user A1.

Figure 8:
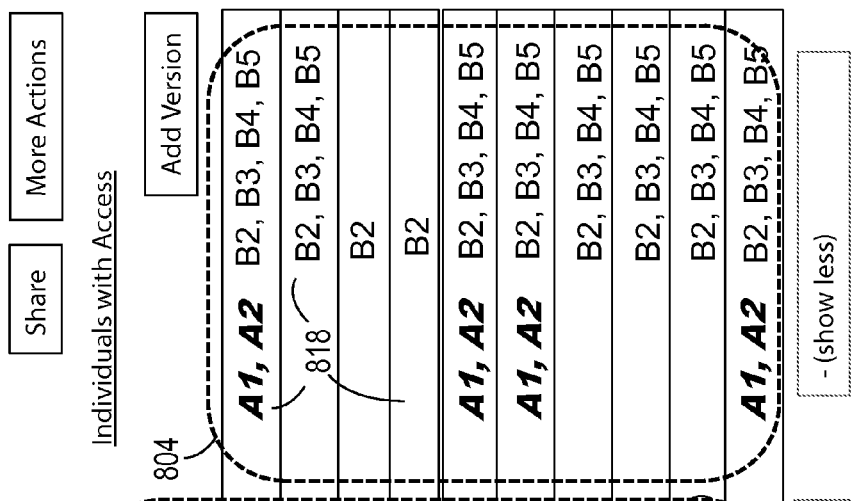
FIG. 8 is a screenshot of an interface for an application displaying information in response to the same search as in FIG. 7 but for a second system user who is negotiating a contract opposite the first system user.

Example of Different Output to Two Different System Users Based on Same Search Criteria for Same Document Chain FIG. 7 and FIG. 8 illustrate example screenshots of how a security and user interaction subsystem 110 could present information to two system users who are associated with two different parties, where the search criteria and requests from both users is identical except that the system user is different. Similar displays could be generated for projects involving more than two parties.

In this example, party A and party B are negotiating a contract. System user A1 is associated with party A, and system user B1 is associated with party B. On January 27 each system user requests information about recent document versions associated with a document chain called "License Agreement" associated with project called "2012 License Deal" between party A and party B.

The relevant history prior to such requests is as follows: (1) January 2 at 8:00 am, A1 started drafting a license agreement based on a document version from another transaction between party A and party X. (2) January 3 at 9:15 am, A1 shared a document version to colleague A2. (3) January 3 at 4:10 pm, A2 shared a modified document version to A1 with a cc to colleague A3. (4) January 4 at 8:00 am, A1 shared a document version to B1, with a cc to A2 and a bcc to A3. (5) January 4 at 09:00, B1 shared the received document version to colleagues B2, B3, B4 and B5. (6) January 5 at 08:00, B1 shared a new document version, incorporating initial notes to B2, B3, B4 and B5. (7) January 8 at 12:32, B2 shared a new document version, incorporating edits and notes, to B1, B3, B4 and B5. (8) January 8 at 12:45, B3 shared a new document version, incorporation notes, to individuals B1, B2, B4 and B5. (9) January 10 at 08:00, B1 shared a new document version to A1 and A2, with a bcc to B2, B3, B4 and B5. (10) January 10 at 09:00, A1 shared the received document version to A3. (11) January 11 at 08:00, A1 shared a new document version to colleagues A2 and A3. (12) January 15 at 12:15, A2 shared a new document version to B1 with a cc to A1 and a bcc to A3. (13) January 15 at 13:00, B1 shared the received document version to colleagues B2, B3, B4 and B5. (14) January 15 at 16:33, B1 shared a new document version to colleague B2 only. (15) January 17 at 08:00, B2 shared a new document version back to B1 only. (16) January 19 at 08:00, B1 shared a new document version to colleagues B2, B3, B4 and B5. (17) January 25 at 20:38, B1 shared a new document version to A1 and A2, with cc to B2 and bcc to B3, B4 and B5. (18) January 25 at 20:38, A1 shared the received document version to colleague A3. (19) January 26 at 12:20, A1 modified the document version but did not share it. (10) January 26 at 16:34, A1 shared a new document version to colleagues A2 and A3.

FIG. 7 illustrates an example screenshot based on information retrieved by the retrieval subsystem 114 in response to such search criteria and requests on behalf of system user A1. FIG. 8 illustrates the results pursuant to the identical requests by system user B1.

Each screen shot includes a system user identifier at the top 708, 808, its party association 710, 810, the counter-party in this project 712, 812, and any additional project identifiers 714, 814. The counter-party's name is designated with a clear visual indicator—here in bold and italix font 712, 812.

It also includes a document chain heading 716, 816 for each document chain meeting the search criteria, and under the document chain it lists the most recent document versions 702, 802, and document version reference are marked with clear visual indicators so that it is immediately visible which document versions were received from other parties—here in bold and italix font 702, 802. To the far right is a column titled "Individuals with Access" 704, 804 where, for each document version, the system lists the other individuals who are known to the system user to have access to such document version 718, 818, and individuals' names or identifiers are distinguished through clear visual indicators to easily identify individuals from other parties—here in bold and italix font 718, 818. Another column includes labels assigned by the system based in part on access information of document versions in the document chain 706, 806.

It is noteworthy that, as is seen in comparing FIG. 7 and FIG. 8, the system retrieves and conveys different information based on who is making the request. It does this based on the information it has about the system user making the request, including what document versions and note version that system user has access to, what party and other individuals the system user is associate with, etc.

For example, the list of document versions conveyed are different in FIG. 7 702 and FIG. 8 802.

For each document version there can be a list of other individuals, in addition to the requesting system user, who have access to such document version 718, 818. Even where both individuals may have access to the document version, the access tracking version manager can track whether it is known that a system user knows of another individual's access.

The labels assigned to individual document versions are different 706, 806.

Example of Retrieval of Information for Sharing with an Individual Who is not a System User.

The retrieval subsystem 114 could use processes similar to those described above in connection with FIG. 4, FIG. 5 and FIG. 6 to retrieve a list of document versions, access information and labels, for document versions and note versions known to be accessible to another individual, by adding search criteria indicating the individual to whom the information will be shared. The results of such a search would be limited based on the document versions, note versions and information that the system user making the request already knows to be accessible to the other individual. Such list could be shared with the other individual for use without accessing or using the system. For example, when sharing a new document version using the sharing subsystem 118, the system could convey to a recipient in an email text or attachment for use and reference without accessing or using the system, a list of highly relevant document versions for that individual.

Similarly, in an example where a system user wishes to share a compilation of note versions with an individual who is not a system user, the retrieval subsystem 114 would receive search criteria indicating the individual to whom the information will be shared, and could include note versions based on whether both the system user and the intended recipient have access to both the note version and the associated item.

Other Embodiments

The present invention has been described in particular detail with respect to one possible embodiment. As will be apparent to those skilled in the art, many aspects of the disclosure may be implemented in various different fashions while still functioning as an access tracking version manager.

The present invention also relates to any method, computer program product, system or apparatus for performing the operations herein. This apparatus may be specially constructed for the required purpose, or it may comprise a general-purpose computer specifically activated or configured by a computer program stored in the computer. Such a computer program may be stored in a computer readable storage medium, such as, but not limited to, any type of disk including floppy disks, optical disks, CD-ROMs, magnetic optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may employ multiple processor designs.

The particular naming of the components, the attributes, data structures, or any other programming or structural aspect is not mandatory or significant, and the mechanisms that implement the inventions or its features may have different names, formats or protocols.

The particular division of functionality between the various subsystems and databases described herein is merely exemplary, and not mandatory. Functions performed by a single component could instead be performed by multiple components, and functions performed by multiple components could instead be performed by a single component.

Each subsystem and database could be implemented in various ways, including using mobile devices, single CPUs, single servers, distributed server-farms, external services or computing clouds—such as the Amazon Elastic Compute Cloud (Amazon EC2) or the Google App Engine.

Each database could be implemented in various ways, including using SQL database(s), NoSQL database(s), file system(s), distributed storage, RAID system(s), disk(s), tape, flash device(s), external services, storage clouds, etc. Each database could also be implemented as various data structures in text files, eXtensible Markup Language (XML), documents, Virtual Storage Access method (VSAM) files, flat files, Btrive files, comma-separated-value (CSV) files, internal variables, or one or more libraries.

An implementation could locate hosting of storage and subsystems with multiple parties while still remaining a single system for purposes of this invention. For example, an implementation could keep storage of document versions and note versions solely on a server that is under the control of one party, except to the limited extent that such items have been affirmatively shared with individuals outside of such party.

Implementations could be set up for deployment by single users, or within a single party. Such implementations could further include protocols for interacting with information from implementations deployed and operated for other single users or within other parties.

Implementations could be built for deployment within a single user's or single party's computing environment without being accessible to external networks.

Implementations could be deployed in contexts where one of the parties to a project, or a party affiliated with such a party, hosts and controls the system.

Although the above description references "individuals" as system users or recipients of information, any such reference can apply equally to another system acting on behalf of the individual.

Although the above description includes in many instances multiple ways that a subsystem can perform an activity, these are intended as examples and not as requirements. An implementation could perform an activity using just one of the many ways offered as examples, or another way to achieve the same result that is not included as an example.

Although the above description lists multiple types of search criteria, types of information, and types of associations which can be handled by the system, each such list is intended as a list of possible examples that could be included in an implementation, and not as a requirement that all such types be included.

Implementations could be within or integrated with a document management system, a communications system such as email, a collaboration or file sharing system, etc.

Although the above description includes an editing subsystem 116 integrated as part of the system, an access tracking version manager could work without an editing subsystem, with an editing subsystem with limited functionality, or integrated with a document viewing or editing system that is fully or partially external. In some such deployments the retrieval subsystem 114 and version tracking subsystem 120 might be activated directly by an external editing subsystem.

Although the above description includes a user management subsystem 112 integrated as part of the system, an access tracking version manager could work with a user management system that is fully or partially external, or in an environment where users are already authenticated such that such activities are not required.

Although the above description includes a sharing subsystem 118 integrated as part of the system, an access tracking version manager could work without any sharing subsystem, with a sharing subsystem with limited functionality, or with a communication system that is fully or partially external, such as email.

Although the above description includes a security and user interaction subsystem 110 integrated as part of the system, an access tracking version manager could work without a security and user interaction subsystem, with a subsystem performing only part of the activities described here, or with one or more partially or fully external systems that perform security and user interaction activities.

Although the above describes each subsystem performing a range of activities, alternate implementations could have significantly less activity without sacrificing the core nature of the access tracking version manager.

Although the above description includes a range of activities related to note versions, including activities by the version tracking subsystem 120 and the individual access tracking subsystem 122, such activities could be reduced or eliminated without sacrificing the essential nature of the access tracking version manager. For example, an access tracking version manager may track notes and who has access to each note, but not multiple alternate versions of the same note, or may forgo separate access tracking for notes.

Although the above description includes the retrieval subsystem 114 performing or coordinating version comparison activities, such activities could be reduced or eliminated without sacrificing the essential nature of the access tracking version manger, or such comparison activities could be performed by a separate subsystem, or by fully or partially external system.

Although the retrieval subsystem 114 is described above with an option to include search criteria for highly relevant document versions, such relevance analysis could be reduced or eliminated without sacrificing the essential nature of the access tracking version manager, or the system could convey information to a fully or partially external system that performs such evaluation. Further, the search criteria for highly relevant document versions as described above are examples. Search criteria for inclusion in a request to retrieve highly relevant document versions can include any number of combinations of search criteria based on the information stored and tracked by the system.

Although the retrieval subsystem 114 is described above as performing labeling, such labeling activities could be eliminated in whole or in part without sacrificing the essential nature of the access tracking version manager, or the system could convey information to a fully or partially external system that performs such activities. Further, system generated labels in FIG. 7 and FIG. 8, and as illustrated in FIG. 6 are examples. Many other types of labels can be generated using the disclosed approach based on the information stored and tracked by the system.

Although the above description includes project tracking activities, including by the individual access tracking subsystem 122, some or all of such activities could be eliminated in whole or in part without sacrificing the essential nature of the access tracking version manager, or such activities could be performed by fully or partially external systems.

Although the above description includes activities relating to tracking parties and groups, including by the individual access tracking subsystem 122, some or all of such activities could be eliminated in whole or in part without sacrificing the essential nature of the access tracking version manager, or such activities could be performed by fully or partially external systems.

Although the above description primarily focuses on tracking and conveying information about access by individuals, an access tracking version manager could primarily track access by parties or defined groups without maintaining and managing information about specific individuals. In that scenario the individual access tracking subsystem 122 would track access by parties or groups rather than by individuals.

The version tracking subsystem 120 and retrieval subsystem 114 could be set up to work with external storage of some or all document versions or note versions. In such a scenario these subsystems could provide relevant information for use by a system user or a system acting on behalf of a system user, to find relevant files in storage that is external to the system, or the retrieval subsystem 114 could directly interact with such external storage, which might include a system user's desktop storage, network storage, cloud storage, a third party document management system, etc.

When receiving search criteria, the retrieval subsystem 114 can be set up to receive multi-part queries at once or in multiple separate parts, or as a mix of both, to accommodate different implementations of a security and user interaction subsystem or an external system which may require combined or piecemeal queries, or a mix of both.

The retrieval subsystem 114 could be set up to query the other subsystems and databases in a different order.

The order of actions presented in FIG. 2-6, and in the associated descriptions, are examples and may be re-ordered by those skilled in the art.

Storage of associations, for example between two items such as a note version and a section of a document version, could be implemented as links between the items or the location within the items, such that the document versions or note versions could function as a document versions information database, note versions database, or note versions information database. Whether a link is included, or what it is linked to, could be based on whether a recipient has or is receiving access to the linked item.

Storage of access information could be implemented as links or otherwise within a document version or note version, such that the document versions or note versions would function as a document versions access database or note versions access database.

Storage of document version information or note version information, including associations, could be implemented in the document version or note version file, for example as file metadata, and thereby using the file information storage as a document versions information database or note versions information database.

The sharing subsystem 118 could be set up so that document version access granted through the sharing subsystem 118 could later be modified or revoked.

A wide range of alerts and questions to the system user could be incorporated to flag and confirm any conclusions otherwise made by the system.

Labeling activities could be set up so that in cases where uncertainty exists as to the origin of a document attachment, the system could provide information to make clear what is known and what is not known. For example, where a document version is received as an attachment to a forwarded communication, in some situations the system and the recipients may not know whether the sender removed the original attachment and substituted in its place a different document version, and the system can flag and convey this uncertainty.

Rules for automatically sharing new document versions or note versions with certain individuals can be incorporated. Examples of sharing rules could include a rule whereby any document version or notes version received by a system user from an individual associated with a counter-party to a negotiation could automatically be shared with certain of the receiving system user's colleagues.

Automatic alerts to a system user can be included for situations where the system user has received access to a document version that is not known to be available to identified individuals, for example colleagues or collaborators, so that the system user can choose whether to share such document versions with such individuals.

How information is conveyed about who has access to different document versions can be conveyed in the form of maps, for example showing access of one or more document versions mapped on an organizational chart.

Solutions for obtaining legally binding signatures, electronically or otherwise, could be included fully or partially within the system.

Purge functionality to delete collections of documents versions and note versions based on search criteria that could include who has access to the items could be included. Further, such deletion activity could be coordinated so that items can be deleted from the system for all parties to a project subject to the authorization of administrators for each of the parties and compliance with legal requirements.

Other implementations may allow system users with access to a document version to see who else has access to that document version, whether or not the grant of access to such other individual was explicitly made known to the individual system.

Language used in the specification has been principally selected for readability and instructional purposes, and may not have been selected to circumscribe the inventive subject matter. Accordingly, the disclosure of the present invention is intended to be illustrative, but not limiting, of the scope of the invention.

Certain embodiments according to the invention have been disclosed, and these are to be taken as illustrative and exemplary and not necessarily limiting on the invention. Other embodiments, features, aspects, benefits, and advantages according to the invention are considered part of this disclosure including one or more combinations of various pieces, subsystems, and/or aspects of the disclosed embodiments whether or not any particular combination is disclosed herein.

The invention claimed is:

1. A computer-implemented method of centralized document version management, the method comprising the steps of:
    establishing, based on information received from a user associated with a first party, a document chain to which individual document versions are associated as a collection, where each document version includes at least some content that is same as content in at least one other document version in the document chain and where the document chain allows for document versions that include some content that is different from content in other document versions in the document chain;
    allowing one or more users associated with the first party to a project to associate a document version to a specified document chain and to obtain initial access granting authority over the associated document version such that the associated document version would be private and exclusive to users associated with the first party and such that users associated with any different party to the project cannot access the associated document version until a grant of access from one or more of the users associated with the first party;
    allowing one or more users associated with a second party to the project, where the users associated with the second party is non-overlapping with the users associated with the first party, to associate a different document version to the specified document chain and to obtain exclusive initial access granting authority over the associated different document version such that the associated different document version would be private and exclusive to the second party and such that users associated with any different party to the project, including users associated with the first party, cannot access the associated different document version until a grant of access from the one or more users associated with the second party;
    allowing a different specified document version to be associated with the specified document chain and to remain private and exclusive to a user that did not first establish the specified document chain but that has access to the different specified document version associated with the specified document chain, such that the different specified document version is private from all other users including a user that first established the specified document chain in the system;
    managing information about each of the plurality of document versions including associations to one or more other document versions and also determining which users have access to which document versions; and
    controlling information conveyed to both the users of the first party and the users of the second party based on the managed information about each of the plurality of document versions in the specified document chain.

2. A system for managing document version access control which allows for at least two non-overlapping sets of users to each maintain privacy as to specific document versions within a single shared document chain, the system comprising:

a hardware processor; and computer-readable storage medium containing instructions executable by the hardware processor to cause the system to:

establish a document chain based on information received from a user of the system associated with a first non-overlapping set of users, and where the document chain consists of a collection of document versions within the system, where each document version includes some content that is same as content in at least one other document version in the document chain and where the document chain allows for document versions that include some content that is different from content in other document versions in the document chain;

store and update information about the document chain;

allow different users of the system to access different document versions within the document chain, where access to each of the document versions in the document chain is controlled by version specific access control settings;

store one or more document versions received from users associated with the first non-overlapping set of users and at least a second non-overlapping set of users that has access to a document version associated with the document chain; and set separate access control settings for each document version, where the system allows for a specified document version to be associated with the document chain and also to remain private and exclusive to the second non-overlapping set of users, such that the specified document version is private from all users that are not associated with the second non-overlapping set of users, including private from all users associated with the first non-overlapping set of users, and further where the system allows for a different specified document version to be associated with the document chain and to remain private and exclusive to a user that did not first establish the document chain but that has access to the different specified document version associated with the document chain, such that the different specified document version is private from all other users including a user that first established the document chain in the system.

3. The system of claim 2 further comprising storage for storing the document versions of the document chain.

4. The system of claim 2 wherein different non-overlapping sets of users of the system are allowed to access different notes versions associated with the different document versions.

5. A system for managing document version access control, the system comprising:

a hardware processor; and computer-readable storage medium containing instructions executable by the hardware processor to cause the system to:

establish a document chain based on information received from a user of the system associated with a first non-overlapping set of users, where the document chain consists of a collection of document versions within the system, where each document version in the document chain includes at least some content that is same as content in at least one other document version in the document chain and where the document chain allows for document versions that include some content that is different from content in other document versions in the document chain;

store and update information about the document chain;

allow different users of the system to access different document versions within the document chain, where access to each of the document versions in the document chain is controlled by version specific access control settings;

set access control settings for at least one document version associated with the document chain, based on information received from a user associated with the first non-overlapping set of users, such that at least one user associated with a second non-overlapping set of users is granted access to at least one document version as part of the document chain, and set different access control settings for at least one specified document version associated with the document chain wherein at least one additional user is granted access to the specified document version as part of the document chain, based on information received from at least one user associated with the second non-overlapping set of users, while keeping the different access control settings invisible to all users not associated with the second non-overlapping set of users, including invisible from the users associated with the first non-overlapping set of users that first established the document chain, and where the system allows for a different specified document version to be associated with the document chain and to remain private and exclusive to a user that did not establish the document chain but that has access to the different specified document version associated with the document chain, such that the different specified document version is private from all other users including a user that first established the document chain in the system.

6. The system of claim 5 wherein the first non-overlapping set of users is associated with the first party and the second non-overlapping set of users is associated with the second party.

7. The system of claim 5 wherein different non-overlapping sets of users of the system are allowed to access different notes versions associated with the different document versions.

* * * * *